United States Patent
Zhang et al.

(10) Patent No.: US 9,783,710 B2
(45) Date of Patent: Oct. 10, 2017

(54) TRIPLY CURABLE OPTICALLY CLEAR ADHESIVE

(71) Applicants: Henkel (China) Company Limited, Shanghai (CN); Henkel IP & Holding GmbH, Duesseldorf (DE)

(72) Inventors: Raymond Zhang, Shanghai (CN); Daoqiang Lu, Shanghai (CN); Shabbir Attarwala, Simsbury, CT (US)

(73) Assignees: Henkel AG & Co. KGaA, Duesseldorf (DE); Henkel IP & Holding GmbH, Duesseldorf (DE)

( * ) Notice: Subject to any disclaimer, the term of this patent is extended or adjusted under 35 U.S.C. 154(b) by 360 days.

(21) Appl. No.: 14/556,757

(22) Filed: Dec. 1, 2014

(65) Prior Publication Data

US 2015/0083317 A1    Mar. 26, 2015

Related U.S. Application Data

(63) Continuation of application No. PCT/CN2013/076469, filed on May 30, 2013.

(30) Foreign Application Priority Data

Jun. 1, 2012  (CN) .......................... 2012 1 0179477

(51) Int. Cl.
| | |
|---|---|
| *C09J 133/10* | (2006.01) |
| *C08G 18/67* | (2006.01) |
| *C08G 18/30* | (2006.01) |
| *C09J 175/16* | (2006.01) |
| *B32B 37/12* | (2006.01) |
| *B32B 38/00* | (2006.01) |
| *C09J 5/00* | (2006.01) |
| *C08G 18/81* | (2006.01) |

(52) U.S. Cl.
CPC .............. *C09J 133/10* (2013.01); *B32B 37/12* (2013.01); *B32B 38/0008* (2013.01); *C08G 18/307* (2013.01); *C08G 18/672* (2013.01); *C08G 18/8175* (2013.01); *C09J 5/00* (2013.01); *C09J 175/16* (2013.01); *B32B 2457/202* (2013.01)

(58) Field of Classification Search
CPC .......... C09J 133/10; C09J 5/00; C09J 175/16; B32B 37/12; B32B 38/0008; C08G 18/307; C08G 18/672; C08G 18/8175
See application file for complete search history.

(56) References Cited

U.S. PATENT DOCUMENTS

| | | | |
|---|---|---|---|
| 6,001,203 A * | 12/1999 | Yamada ................. | C09J 163/10 |
| | | | 156/106 |
| 6,617,371 B2 | 9/2003 | Ha | |
| 7,060,750 B2 | 6/2006 | Jansen et al. | |
| 2002/0058146 A1* | 5/2002 | Schwalm ............ | C08F 290/147 |
| | | | 428/423.1 |
| 2002/0198279 A1 | 12/2002 | Ha | |
| 2005/0245716 A1 | 11/2005 | Jansen et al. | |
| 2012/0080068 A1 | 4/2012 | Bae et al. | |
| 2015/0083317 A1 | 3/2015 | Zhang et al. | |

FOREIGN PATENT DOCUMENTS

| | | | | |
|---|---|---|---|---|
| CN | 104797675 | | 12/2013 | |
| EP | 0329441 A1 * | | 8/1989 | .......... C08F 290/067 |
| JP | 05097963 A | | 4/1993 | |
| JP | 2001525467 A | | 12/2001 | |
| JP | 2009197053 A | | 9/2009 | |
| JP | 2011190421 A | | 9/2011 | |
| KR | 20110105486 A | | 9/2011 | |

OTHER PUBLICATIONS

ASTM D1005-2007 Standard Test Method for Measurement of Dry-Film Thickness of Organic Coatings Using Micrometers; 3 pages.
International Search Report issued in connection with International Patent Application No. PCT/CN2013/076469.

* cited by examiner

*Primary Examiner* — Daniel McNally
(74) *Attorney, Agent, or Firm* — Steven C. Bauman

(57) ABSTRACT

The present invention provides an adhesive composition, which can be cured through three ways: UV-radiation curing, thermal-radiation curing and moisture-curing. The adhesive composition comprises a) an oligomer having an isocyanate group and a (meth)acryloxy group; b) a (meth) acrylic monomer and/or oligomer not having an isocyanate group; c) a photoinitiator; and d) a peroxide.

10 Claims, No Drawings

TRIPLY CURABLE OPTICALLY CLEAR ADHESIVE

TECHNICAL FIELD

The present invention relates to an adhesive composition, which can be cured by three ways of UV-radiation curing, thermal-radiation curing and moisture-curing.

BACKGROUND ARTS

Adhesives are widely used in the liquid crystal display (LCD) products for bonding parts and sealing. The LCD products include digital products such as mobiles, televisions, laptops, PC and the like.

UV-radiation curable adhesives, thermal-curable adhesives and moisture-curable adhesives are now known in the art.

As an example of the moisture-curable adhesives, U.S. Pat. No. 7,060,750 B2 discloses moisture-curable polyether urethanes and their use in sealants, adhesives or coating compositions. Specifically, the sealants, adhesives or coating compositions disclosed in U.S. Pat. No. 7,060,750 B2 comprise three components: a) 20 to 80 wt. % of a polyether urethane containing two or more reactive silane groups and one or more polyether segments; b) 20 to 80 wt. % of a polyether urethane containing one reactive silane group and one or more polyether segments; and c) 1 to 60 wt. % of a pigment having a BET surface area of from 15 to 100 m$^2$/g and an oil absorption of from 40 to 110 cc/100 g.

As an example of the thermal-curable adhesive, U.S. Pat. No. 6,617,371 B2 discloses a single component room temperature stable thermal-curable (meth)acrylate resin adhesive, comprising: about 5 to about 70 wt. % of at least one (meth)acrylate monomer; about 5 to about 94 wt. % of a (meth)acrylate oligomer; and about 0.1 to about 10 wt. % of a thermal initiator selected from the group consisting of diacyl peroxides, benzoyl peroxides and peroxyesters.

Up to now, there is however no report on the adhesive curable by the three ways, especially the adhesive that is curable by the three ways and suitable to be used in the LCD products. For an adhesive to be used in the LCD products, it is usually desired that the cured products thereof have a high transparency.

At present, there are many deficiencies as to the adhesives used in the assembly of LCD panel and as to the assembling processes. For example, shadow areas exist at edges of LCD panel or at regions covered by PCB and the like, under the condition of photo curing, the adhesive in these shadow areas can not be cured, and hence, an unfirm bonding may be resulted. If the uncured adhesive diffuses to the display area, it may cause corrosion and failure of the display area.

The three curing ways of UV-curing, thermal-curing and moisture-curing each have their own properties and deficiencies. The time experienced in the UV-curing is the shortest, but the UV-curing has high requirements for the devices, and uncured adhesives may remain in the shadow areas. The time experienced in the thermal-curing is longer than that in the UV-curing, but the thermal-curing is not suitable for bonding and sealing precision parts sensitive to heat. The moisture-curing has low requirements for the device, but experiences a relatively long curing time.

Therefore, there exists need for developing an adhesive that can be cured by any one way of UV-curing, thermal-curing and moisture-curing. Ideally, such an adhesive also has a high transparency.

SUMMARY OF THE INVENTION

In order to solve the problems in the art, the present invention provides a new adhesive composition, which can be cured by three ways of UV-curing, thermal-curing and moisture-curing.

The adhesive composition of the invention comprises:
a) an oligomer having an isocyanate group and a (meth)acryloxy group;
b) a (meth)acrylic monomer and/or oligomer not having an isocyanate group;
c) a photoinitiator; and
d) a peroxide.

The adhesive composition of the invention may further comprise an organometal catalyst.

In an embodiment of the present invention, the adhesive composition specifically comprises the components of:
about 20 to about 80 wt. % of an oligomer having an isocyanate group and a (meth)acryloxy group;
about 20 to about 80 wt. % of a (meth)acrylic monomer and/or oligomer not having an isocyanate group;
about 0.1 to about 3.0 wt. % of a photoinitiator;
about 0 to about 3 wt. % of an organometal catalyst; and
about 0.1 to about 3 wt. % of a peroxide.

The total weight percents of the components in the adhesive composition add up to 100 wt. %.

The present invention further provides a method for bonding and sealing, wherein the adhesive composition of the invention is used, comprising:
Irradiating the region to be bonded or sealed that is coated with the adhesive composition of the invention with a UV-light;
Placing the parts to be bonded or sealed under a thermal-curing condition; and/or
Placing the parts to be bonded or sealed under a moisture-curing condition.

The present invention further relates to LCD products in which the adhesive of the invention is used.

Besides the property of being curable via three ways, the cured adhesive of the present invention also has an excellent optical performance, and a good adhesion to the glass and plastic substrates.

Other features, aspects or advantages will be more apparent with reference to the following illustration, examples and the appended claims.

Embodiments

All technical terms and scientific terms used herein have the same meanings as those commonly understood by those skilled in the art, unless indicated otherwise. In case that the meanings understood by those skilled in the art conflict with the meanings defined herein, the meanings defined herein shall be used as the criterion.

All percentages, parts, proportions and the like mentioned herein are based on weight.

The materials, methods and examples are all illustrative, and should not be understood as being restrictive.

The adhesive of the invention is a single package adhesive, also called as one component adhesive. Unlike multi-package adhesives, all components of the single package adhesive are mixed together before application, and do not need to be mixed at the time of application.

The adhesive composition of the invention comprises:
a) an oligomer having an isocyanate group and a (meth)acryloxy group;
b) an (meth)acrylic monomer and/or oligomer not having an isocyanate group;
c) a photoinitiator; and
d) a peroxide.

Beside the components mentioned above, in order to accelerate the moisture-curing reaction, the adhesive of the invention optionally comprises an organometal catalyst.

Specific examples of each component and their contents in the adhesive composition will be described as below.

Component a) an Oligomer Having an Isocyanate Group and a (Meth)Acryloxy Group

The oligomer having an isocyanate group and a (meth)acryloxy group to be used in the present invention can be, for example, aliphatic urethane oligomers, polyester oligomers, polyether oligomers, epoxy oligomers and the like, or the combinations thereof.

The term "(meth)acryl" used herein (i.e., $CH_2=CRC(O)$—, wherein R is H or $CH_3$) indicates acryl, methacryl or any combination thereof. Similarly, the term "(meth)acryloxy" indicates acryloxy, methacryloxy or any combination thereof; the term "(meth)acrylic acid" indicates acrylic acid, methacrylic acid or any combination thereof; the term "(meth)acrylate" indicates acrylate, methacrylate or any combination thereof; and the term "(meth)acrylamide" indicates acrylamide, methacrylamide or any combination thereof. The number of the (meth)acryl group in the (meth)acrylate usable in the present invention is not particularly limited and can be one or more.

The oligomer contains at least one (meth)acrylate function, preferably at the chain end of the molecular.

The oligomer further contains at least one isocyanate function, which can be at the chain end of the molecular, or in the side chain.

In one embodiment of the adhesive of the invention, an aliphatic urethane having an isocyanate group and a (meth)acryloxy group is used.

The molecular weight of the (meth)acrylate oligomer having an isocyanate group (—NCO) of the invention is not particularly limited, and can be in a range of about 500 to about 30,000, preferably about 2,000 to about 20,000.

The Tg of the oligomer preferably is in a range of about −80 to 0° C., more preferably about −50 to 0° C. The Brookfield viscosity at 50° C. is in a range of about 5,000 to about 60,000 mPa·s, preferably about 20,000 to about 55,000 mPa·s; or the Brookfield viscosity at 60° C. is in a range of about 5,000 to about 50,000 mPa·s, preferably about 9,000 to about 40,000 mPa·s; or the Brookfield viscosity at 25° C. is in a range of about 1,000 to about 40,000 mPa·s, preferably about 2,000 to about 25,000 mPa·s. The Brookfield viscosity is in each case measured with spindle No. 52 and a rotation speed of 1 rpm.

The amount of component a) is in a range of about 20 wt. % to about 80 wt. %, preferably about 30 wt. % to about 70 wt. %, more preferably about 40 wt. % to about 60 wt. %, based on the total weight of the adhesive composition of the invention.

Component b) a (Meth)Acrylic Monomer and/or Oligomer not Having an Isocyanate Group;

The adhesive composition of the invention further comprises a monomer selected from (meth)acrylic acid, (meth)acrylates and (meth)acrylamides. As a difference to the (meth)acrylic monomer having an isocyanate group of component a), the (meth)acrylic monomers of component b) do not contain an isocyanate group. The monomer molecular has an unsaturated (meth)acryl group, and can undergo a curing reaction when subjected to a light irradiation. There monomers also can be used to adjust the viscosity and the adhesion property of the adhesive composition since they have a relatively low viscosity at normal temperature, and they can also adjust the transparency of the adhesive composition and improve the storage stability of the composition.

The term "(meth)acryl" used herein (i.e, $CH_2=CRC(O)$—, wherein R is H or $CH_3$) indicates acryl, methacryl or any combination thereof. Similarly, the term "(meth)acryloxy" indicates acryloxy, methacryloxy or any combination thereof; the term "(meth)acrylic acid" indicates acrylic acid, methacrylic acid or any combination thereof; the term "(meth)acrylate" indicates acrylate, methacrylate or any combination thereof; and the term "(meth)acrylamide" indicates acrylamide, methacrylamide or any combination thereof.

The (meth)acrylates used in the present invention are not particularly limited and can be mono-functional (meth)acrylates and multi-functional (meth)acrylates.

As illustrative examples of the mono-functional (meth)acrylates, mentioned may be alkyl (meth)acrylates, alkenyl (meth)acrylates, and heterocyclo (meth)acrylates.

Said alkyl preferably is a substituted or unsubstituted alkyl group having 1 to 20 carbon atoms, preferably 1 to 10 carbon atoms, optionally having at least one substituent selected from an alkyl group having 1 to 10 carbon atoms, an alkoxy group having 1 to 10 carbon atoms, an aryloxy group having 6 to 10 carbon atoms, an epoxy group having 2 to 10 carbon atoms, hydroxyl and the like.

Said alkenyl preferably is a substituted or unsubstituted alkenyl group having 2 to 20 carbon atoms, preferably 2 to 10 carbon atoms, optionally having at least one substituent selected from an alkyl group having 1 to 10 carbon atoms, an alkoxy group having 1 to 10 carbon atoms, an aryloxy group having 6 to 10 carbon atoms, an epoxy group having 2 to 10 carbon atoms, hydroxyl and the like.

Said heterocyclo preferably is a substituted or unsubstituted heterocyclo group having 2 to 20 carbon atoms, preferably 2 to 10 carbon atoms, containing at least one hetero atom selected from N and O, and optionally having at least one substituent selected from an alkyl group having 1 to 10 carbon atoms, an alkoxy group having 1 to 10 carbon atoms, an aryloxy group having 6 to 10 carbon atoms, an epoxy group having 2 to 10 carbon atoms, hydroxyl and the like.

The specific examples of the mono-functional (meth)acrylates include, but not limited to, methyl (meth)acrylate, ethyl (meth)acrylate, butyl (meth)acrylate, tetrahydrofuryl (meth)acrylate, lauryl acrylate, isooctyl acrylate, isodecyl acrylate, 2-ethylhexyl acrylate, isobornyl (meth)acrylate, dicyclopentenyl (meth)acrylate, octadecyl acrylate, 2-hydroxyethyl (meth)acrylate, 2-hydroxypropyl (meth)acrylate, 2-hydroxybutyl (meth)acrylate, 2-(2-ethoxyethoxy)ethyl acrylate, 2-phenoxyethyl acrylate, dicyclopentadienyl (meth)acrylate, dicyclopentenyloxyethyl (meth)acrylate, morpholine (meth)acrylate, caprolactone acrylate, and the like.

The specific examples of the multi-functional (meth)acrylates include, but not limited to, ethylene glycol dimethacrylate, hexanediol di(meth)acrylate, trimethylolpropane triacrylate, pentaerythritol tetraacrylate, and the like.

The (meth)acrylamides used in the present invention are not particularly limited and can be unsubstituted (meth)acrylamides, or N-alkyl substituted (meth)acrylamides or N,N-dialkyl substituted (meth)acrylamides.

In the N-alkyl substituted (meth)acrylamides, the alkyl substituent preferably has 1 to 8 carbon atoms, such as N-ethyl acrylamide, N-octyl acrylamide and the like. In the N,N-dialkyl substituted (meth)acrylamides, the alkyl substituent preferably has 1 to 4 carbon atoms, such as N,N-dimethyl acrylamide, N,N-diethyl acrylamide and the like.

(Meth)acrylates are preferably used as component b) of the adhesive composition of the invention.

The monomers selected from (meth)acrylic acid, (meth) acrylates and (meth)acrylamides are liquid at normal temperature. As used herein, the term "normal temperature" means 25 ° C.

In the adhesive composition of the invention, the monomers selected from (meth)acrylic acid, (meth)acrylates and (meth)acrylamides can be used alone or in a combination of two or more.

As component b), an oligomer not having an isocyanate group but having a (meth)acryloxy group can also be used.

The (meth)acryloxy group can be at any position in the oligomer molecular, preferably at the end of the main chain and/or in the side chain.

Preferably, the oligomer having a (meth)acryloxy group is polybutadiene having a (meth)acryloxy group, polyisoprene having a (meth)acryloxy group, such as UC-203 and UC-102 commercially from Kuraray; urethane having a (meth)acryloxy group, such as CN962, CN964, CN965, CN934, CN972, CN8004 and CN9002 commercially from Sartomer, BR3641AA commercially from Bomar; polyester having a (meth)acryloxy group, such as CN292, CN2200, CN9021 and CN2255 commercially from Sartomer, or any combination of these oligomers. All of these oligomers can be commercially obtained.

Other examples of the oligomer having a (meth)acryloxy group include, but not limited to, styrene-butadiene copolymer having a (meth)acryloxy group, acrylonitrile-butadiene copolymer having a (meth)acryloxy group, polyisobutene having a (meth)acryloxy group, ethylene propylene rubber (ethylene-propylene copolymer) having a (meth)acryloxy group, butyl rubber (isobutene-isoprene copolymer) having a (meth)acryloxy group, brominated butyl rubber (brominated isobutene-isoprene copolymer) having a (meth)acryloxy group, chlorinated butyl rubber (chlorinated isobutene-isoprene copolymer) having a (meth) acryloxy group, and their any combination. Styrene-propylene copolymer, butyl rubber (isobutene-isoprene copolymer) having a (meth)acryloxy group, brominated butyl rubber (brominated isobutene-isoprene copolymer) having a (meth)acryloxy group, chlorinated butyl rubber (chlorinated isobutene-isoprene copolymer) having a (meth)acryloxy group, and their any combination. The counterparts not having a (meth)acryloxy group of these resins can be commercially obtained, and these counterparts have reactive groups such as hydroxyl group in their molecules, which can react with (meth)acrylates to obtain the corresponding oligomer having a (meth)acryloxy group as known to those skilled in the art.

Urethane having a (meth)acryloxy group is preferable in the present invention. Further preferable is the aliphatic urethane having a (meth)acryloxy group, the Brookfield viscosity at 25° C. of which can vary in the range of several thousand cp to hundreds of thousand cp, such as about 1,000 cp to about 190,000 cp. The aliphatics is relative to the aromatics as long as the molecules do not contain an aromatic ring, since the aromatic ring may deteriorate color properties and transparency. Typically, the aliphatic urethane may be polyester urethane, polyether urethane, polybutadiene urethane and the like.

Preferably, the oligomer having a (meth)acryloxy group contains at least one epoxy group. Since the oligomer has both an epoxy group and a (meth)acryloxy group, the two reactive groups both can subject to chemically crosslinking, and hence, can advantageously improve curing properties and contribute fast curing property to the adhesive composition.

The oligomers may be produced through esterification between the corresponding epoxy resins and (meth)acrylic acid, such as the reaction product of bisphenol A diglycidyl ether and (meth)acrylic acid.

Preferably, the oligomer having a (meth)acryloxy group is liquid at 25° C.

Preferably, the Tg of the oligomer having a (meth)acryloxy group is in a range of about −100° C. to 20° C.

Preferably, the oligomer having a (meth)acryloxy group has an average functionality of the (meth)acryloxy group of more than 0 and ≤3, preferably more than 0.5 and ≤3. The term "average functionality" mentioned above refers to the average number of the (meth)acryloxy group in each molecular chain.

In the adhesive composition of the invention, the oligomer having a (meth)acryloxy group may be used alone or in a combination of two or more of any ratios.

The adhesive composition of the invention contains at least one selected from (meth)acrylate monomers and oligomers having a (meth)acryloxy group.

The adhesive composition of the invention may contain both a (meth)acrylic monomer not having an isocyanate group and a (meth)acrylic oligomer not having an isocyanate group.

The amount of component b) is in a range of about 20 wt. % to about 80 wt. %, preferably about 30 wt. % to about 70 wt. %, more preferably about 40 wt. % to about 60 wt. %, based on the total weight of the adhesive composition of the invention.

Component c) a Photoinitiator

The photoinitiator is used to initiate the photo-polymerization of components a), b) and c), and to accelerate the photo-curing speed of the adhesive composition. The adhesive composition of the invention preferably contains a free radical photoinitiator.

The photoinitiators used in the present invention are not particularly limited and, for example, benzil ketals photoinitiators, hydroxyketones photoinitiators, aminoketones photoinitiators and acyl phosphine peroxides photoinitiators can be used.

The adhesive of the invention may contain one photoinitiator, or two or more photoinitiators may also be used in combination.

The specific examples of the benzil ketals photoinitiators include for example commercially obtained IRGACURE 651 (chemical name: 2,2-dimethoxy-1,2-diphenyl-ethan-1-one).

The specific examples of the hydroxyketones photoinitiators include for example commercially obtained Darocure 1173 (HMPP), Darocure 2959 (HHMP) and Darocure 184 (chemical name: 1-hydroxycyclohexyl benzophenone, ab. HCPK) and the like.

The specific examples of the aminoketones photoinitiators include for example commercially obtained Irgacure 907 (chemical name: 2-methyl-1-[4-(methylthio)-phenyl]-2-morpholinopropan-1-one, ab. MMMP), Irgacure369 (BDMB) and the like.

The specific examples of the acyl phosphine peroxides photoinitiators include for example commercially obtained TEPO (chemical name: ethyl 2,4,6-trimethylbenzoyl-phenylphosphinate), TPO (chemical name: trimethylbenzoyl diphenylphosphine oxide) and Irgacure 819 (chemical name: phenyl bis(2,4,6-trimethylbenzoyl)phosphine oxide, ab. BAPO, commercially from Ciba Specialty Chemicals Inc.) and the like.

In the adhesive composition of the invention, the photoinitiator may be used alone or in a combination of two or more of any ratios.

The amount of photoinitiator is in a range of 0.1 wt. % to 3.0 wt. %, preferably 0.5 wt. % to 2.5 wt. %, based on the total weight of the adhesive composition of the invention.

Component d) an Organic Peroxide

The adhesive of the invention comprises an organic peroxide as the thermal initiator. The organic peroxide can be peroxydicarbonates such as di(2-ethylhexyl) peroxydicarbonate; acyl peroxides such as Lauroyl peroxide; alkyl peroxides such as 2,5-dimethyl-2,5-di(tert-butylperoxy) hexane; peroxyesters such as tert-butyl peroxybenzoate; and the like.

In the adhesive composition of the invention, the peroxide may be used alone or in a combination of two or more peroxides.

In one embodiment of the invention, peroxyesters are used to carry out the thermal-curing procedure.

In another embodiment of the invention, alkyl peroxides are used to carry out the thermal-curing procedure.

The amount of the organic peroxide is in a range of 0.5 wt. % to 5 wt. %, based on the total weight of the adhesive composition of the invention.

Organometal Catalyst

The organometal catalyst can be comprised in the adhesive of the invention to trigger and accelerate the moisture-curing reaction. The specific added amount of the organometal catalyst may be adjusted depending on the product properties to be realized, and sometimes, the amount added may be zero.

The organometal catalysts preferably are organic tin catalysts such as stannous octoate, dibutyltin dilaurate, dibutyltin diacetate and the like. Most of these tin catalysts are colorless to pale yellow liquids, and are used to catalyze the moisture-curing reaction of (meth)acrylate polymers having an isocyanate group.

In one embodiment of the invention, dibutyltin dilaurate is used as the catalyst of moisture-curing reaction.

The amount of the catalyst of moisture-curing reaction is in a range of 0 wt. % to 3 wt. %, or 0.1 wt. % to 5 wt. %, or 0.1 wt. % to 1 wt. %, based on the total weight of the adhesive composition of the invention. It is also possible for the adhesive system of the invention to not contain the catalyst of moisture-curing reaction.

Other Auxiliaries

Besides the components mentioned above, the adhesive composition of the invention may also comprise other auxiliaries such as photo stabilizers, thermal stabilizers, photo-initiated promoters, thermal-initiated promoters, leveling agents, tougheners, thickeners and the like.

These auxiliaries may be added in a suitable amount depending on the specific requirements to the adhesive properties. In the adhesive composition of the invention, the amount of the auxiliaries is in a range of 0.01 wt. % to 1 wt. %, or 1 wt. % to 2 wt %, or 0 wt. % to 2 wt. %.

Methods for Using the Adhesive of the Invention

The adhesive of the invention can be applied to regions to be sealed or substrates to be bonded by conventional methods known in the art. The adhesive of the invention has an excellent bonding effect to glass and plastic substrates.

After applying the adhesive of the invention onto predetermined regions, UV-irradiation may be conducted firstly, which leads to fast curing of the adhesive on light-reachable areas, for example, within 5 to 30 seconds.

In order to cure the adhesive on shadow areas, a portion or whole of bonded or sealed parts may be placed under a relatively high temperature, for example 80° C. Thermal curing generally requires a relatively long time, for example, more than 10 minutes to one hour.

For parts easy to be embrittled and to be damaged at a higher temperature, the adhesive of the invention also provides a possibility to cure the adhesive on shadow areas at normal temperature. The time of moisture-curing normally is longer than that of thermal-curing. Sometimes, it may take as long as one day to achieve complete curing.

According to different applications and production processes, the adhesive of the invention can be cured with any combination of the three curing ways. For example, the adhesive of the invention can be cured via UV curing or thermal curing or moisture curing alone, or can be cured via the combination of UV curing and thermal curing, of thermal curing and moisture curing, or of moisture curing and thermal curing. The order of different curing ways could be adjusted according to the actual conditions.

Therefore, the adhesive of the invention provides very flexible curing ways for the operators, and brings considerable convenience to the adhesion, assembly and sealing of electronic elements.

Besides the advantage of operation convenience, the adhesive of the invention also has other advantages.

The optical performance of the adhesive of the invention is much excellent. After curing, the transmittance is more than 90% and the haze is lower than 1% and b value is lower than 1. Therefore, the adhesive of the invention is very suitable for bonding liquid crystal panel.

The adhesion strength of the adhesive of the invention is also very good, for example in a range of 0.2 to 1.5 MPa.

The viscosity of the adhesive of the invention could be adjusted in a wide range according to different applications and process conditions, for example, in the range of 1,000 mPa·s to 10,000 mPa·s at 25° C. (measured with a Brookfield viscosimeter, spindle No. 52, rotation speed 1 rpm).

The use of the adhesive of the invention is not limited to bonding and sealing, and could also be used for example to form a hard-coat layer functioning as a protective layer on the surface of a part.

EXAMPLES

The examples as well as data of effects shown as below are used to detailedly describe the advantages of the present invention and how to carry out the present invention. However, the protection scope of the present invention is not limited to these examples.

Materials for Experiments

Desmolux D 100 (Bayer, AG)
CN9021 (Sartomer Chemical Ltd.)
Desmolux VP LS 2396 (Bayer, AG)

Test Methods

To testify the excellent performances of the adhesive composition of the invention, properties of UV-curing, moisture-curing, thermal-curing, adhesion strength and transmittance were tested.

UV-Curing Test

The UV-curing test was carried out at room temperature at a wavelength of about 200 nm to about 400 nm using a UV light source (Loctite UVALOC 1000, Henkel AG) which has a radiation energy of about 3000 mJ/cm$^2$. For example, irradiation to each adhesive composition was carried out about 30 seconds or more at a radiation power of about 100 mW/cm².

Moisture-Curing Test at Room Temperature

After bonded with the adhesive composition, the samples were put into a room with absolutely no light at a constant temperature (23±2° C.) and constant moisture (50±10% RH). To ensure no light, the samples may be covered by aluminium foil. According to predetermined target time, the result of moisture curing was checked.

Thermal-Curing Test

The thermal curing test was carried out for the adhesive composition between glass and polycarbonate (PC) in a temperature-adjustable oven with a highest temperature of not lower than 200° C. under no light condition. The specific curing temperature and time depend on the specific formulation of the adhesive composition.

Test of Adhesion Strength

The adhesion strength is used to characterize the bonding strength between two substrates brought by fully cured adhesive composition. Normally the thickness of curing layer was around 100 μm according to requirements. The substrates were chosen from glass plates, PMMA plates and polyester plates. The equipment for test was Universal tensile test machine (Instron 5569, Instron Inc.). During this test, the two sample plates bonded together were pulled apart in an opposite direction. The adhesion strength (MPa) was obtained by dividing the force value tested by the bonded area.

Test of Transmittance

The transmittance of the cured adhesive composition in visible light region was tested by a UV and visible light spectrophotometer. The curing thickness of the adhesive composition was controlled by two glass layer to around 100 μm. Test method refers to ASTM D1005-2007. According to the test method, the adhesive composition between two glass plates was irradiated for 30s by a UV light with a radiation power of 100mW/cm², and the transmittance of the cured adhesive composition was tested.

Preparation of the Adhesive Composition

Example 1

At room temperature, 50.75 parts by weight of Desmolux D 100, 45 parts by weight of isobornyl acrylate and 2 parts by weight of 2-hydroxyl-2-methyl-1-phenyl-1-acetone were weighted separately into a stirred tank to conduct stirring, and the stirring rate was set at about 60 rpm and the stirring time was about 60 min. Subsequently, 1 parts by weight of (2,4,6-trimethylbenzoyl)-diphenyl-phosphine oxide, 0.25 parts by weight of dibutyltin dilaurate and 2 parts by weight of 1,1-ditertbutylperoxy-3,3,5-trimethyl-cyclohexane were weighted separately into the stirred tank, and the stirring rate was set at about 100 rpm and the stirring was further carried out about 60 min. After all components were mixed evenly, the mixture was filtered. During the whole process of feeding and mixing, keep away from light and keep a constant temperature.

The formulation of the adhesive composition according to Example 1 is as below:

| Components | Parts by weight |
| --- | --- |
| Desmolux D 100: aliphatic urethane (meth)acrylate oligomer having an isocyanate group | 50.75 |
| isobornyl acrylate | 45 |
| 2-hydroxyl-2-methyl-1-phenyl-1-acetone | 2 |
| (2,4,6-trimethylbenzoyl)-diphenyl-phosphine oxide | 1 |
| dibutyltin dilaurate | 0.25 |
| 1,1-ditertbutylperoxy-3,3,5-trimethylcyclohexane | 2 |

The inventive adhesive compositions of Examples 2 to 5 and the adhesive compositions of Comparative Examples 1 to 4 were prepared in the same manner as in Example 1 except that the formulation of the adhesive composition was changed.

The formulations of Example 1 and Comparative Examples 1 to 4 as well as their performance data of UV curing, moisture curing and thermal curing are shown in Table 1.

TABLE 1

| | | Contents of components in different Examples (wt %) | | | | |
| --- | --- | --- | --- | --- | --- | --- |
| Component type | Component name | Example 1 | Comparative Example 1 | Comparative Example 2 | Comparative Example 3 | Comparative Example 4 |
| (Meth)acrylate oligomer | Desmolux D 100: aliphatic urethane (meth)acrylate oligomer having an isocyanate group | 50.75 | 50.75 | 50.75 | 75.75 | / |
| (Meth)acrylate oligomer | CN9021: aliphatic urethane (meth)acrylate | / | / | / | / | 75 |
| (Meth)acrylate monomer | isobornyl acrylate | 45 | 40 | 46 | 24 | 20 |
| (Meth)acrylate monomer | hydroxypropyl (meth)acrylate | / | 6 | / | / | / |
| Photoinitiator | 2-hydroxyl-2-methyl-1-phenyl-1-acetone | 2 | 2 | / | / | 3 |
| Photoinitiator | (2,4,6-trimethylbenzoyl)-diphenyl-phosphine oxide | 1 | 1 | / | / | 2 |
| Organometal catalyst | dibutyltin dilaurate | 0.25 | 0.25 | 0.25 | 0.25 | / |
| Peroxide | 1,1-ditertbutylperoxy-3,3,5-trimethylcyclohexane | 2 | / | 2 | / | / |
| Peroxide | tert-butyl peroxybenzoate | / | / | 1 | / | / |
| Performance test 1 | UV-curing (room temperature; glass to PC), 30 s@UVA (100 mW) | Cured within 30 s | Cured within 30 s | Not cured | Not cured | Cured within 30 s |
| Performance test 2 | Moisture curing (room temperature and keep away from light, glass to PC), 23° C., 60% RH | Cured within 24 hours | Cured within 24 hours | Cured within 24 hours | Cured within 24 hours | Not cured |
| Performance test 3 | Thermal curing (keep away from light, glass to PC), 80° C. oven | Cured after 1 hour | Not cured | Cured after 1 hour | Not cured | Not cured |

Table 1 shows that the adhesive compositions of the invention can be cured via three ways, and have excellent curing properties in each way of UV-curing, moisture-curing and thermal-curing.

Table 2 shows five Examples of the inventive adhesive composition. All of them can be cured via three ways. Through adjusting proportions of each component, different thermal-curing effects and adhesion strengths can be achieved after curing.

TABLE 2

| Component type | Component name | Contents of components in different Examples (wt %) | | | | |
| --- | --- | --- | --- | --- | --- | --- |
| | | Example 1 | Example 2 | Example 3 | Example 4 | Example 5 |
| (Meth)acrylate oligomer | Desmolux D 100: aliphatic urethane (meth)acrylate oligomer having an isocyanate group | 50.75 | 50.75 | 50.75 | 15.75 | / |
| (Meth)acrylate oligomer | Desmolux VP LS 2396: aliphatic urethane (meth)acrylate oligomer having an isocyanate group | / | / | / | 35 | 50.75 |
| (Meth)acrylate monomer | isobornyl acrylate | 45.5 | 44.5 | 22 | 22 | 22 |
| (Meth)acrylate monomer | hydroxypropyl (meth)acrylate | / | / | 22 | 22 | 22 |
| Photoinitiator | 2-hydroxyl-2-methyl-1-phenyl-1-acetone | 2 | 2 | 2 | 2 | 2 |
| Photoinitiator | (2,4,6-trimethylbenzoyl)-diphenyl-phosphine oxide | 1 | 1 | 1 | 1 | 1 |
| Organometal catalyst | dibutyltin dilaurate | 0.25 | 0.25 | 0.25 | 0.25 | 0.25 |
| Peroxide | 1,1-ditertbutylperoxy-3,3,5-trimethylcyclohexane | 1.5 | 1.5 | 2 | 2 | 2 |
| Peroxide | tert-butyl peroxybenzoate | / | 1 | 1 | 1 | 1 |
| Performance test 1 | UV curing (room temperature, glass to PC), 30 s@UA (100 mW/cm$^2$) | Cured within 30 s | Cured within 30 s | Cured within 30 s | Cured within 30 s | Cured within 30 s |
| Performance test 2 | Moisture curing (room temperature and keep away from light, glass to PC), 23° C., 60% RH | Cured within 24 h | Cured within 24 h | Cured within 24 h | Cured within 24 h | Cured within 24 h |
| Performance test 3 | Thermal curing (keep away from light, glass to PC), oven (temperature-adjustable and the highest temperature being not lower than 200° C.) | 2 hr @80° C. | 1 hr @80° C. | 2 hr @70° C. | 2 hr @70° C. | 2 hr @70° C. |
| Performance test 4 | Adhesion strength (glass plate to glass plate, curing conditions: UVA with power 100 mW/cm$^2$, 30 s) | >0.4 Mpa | >0.4 Mpa | >0.6. Mpa | >0.6 Mpa | >0.6 Mpa |
| Performance test 5 | Transmittance (glass plate to glass plate, curing condition: UVA with power 100 mW/cm$^2$, 30 s) | >92% | >92% | >92% | 92% | 92% |

The present invention is illustrated in details in the embodiments; however, it is apparent for those skilled in the art to modify and change the embodiments without deviating from the spirit of the invention. All the modifications and changes should fall in the scope of the appended claims of the present application.

What is claimed is:

1. An adhesive composition, comprising:
   a) an oligomer having an isocyanate group and a (meth)acryloxy group;
   b) a (meth)acrylic monomer and/or oligomer not having an isocyanate group;
   c) a photoinitiator; and
   d) a peroxide.

2. The adhesive composition according to claim 1, wherein said composition further comprises an organometal catalyst.

3. The adhesive composition according to claim 2, wherein said organometal catalyst is selected from stannous octoate, dibutyltin dilaurate and dibutyltin diacetate.

4. The adhesive composition according to claim 1, wherein said component a) is an aliphatic urethane having an isocyanate group and a (meth)acryloxy group.

5. The adhesive composition according to claim 1, wherein said component b) is an aliphatic (meth)acrylate monomer.

6. The adhesive composition according to claim 1, wherein said photoinitiator is selected from hydroxyketones initiators and acyl phosphine peroxides initiators.

7. The adhesive composition according to claim 1, wherein said peroxide is selected from peroxyesters and alkyl peroxides.

8. The adhesive composition according to claim 1, comprising
   20 wt. % to 80 wt. % of an oligomer having an isocyanate group and a (meth)acryloxy group;
   20 wt. % to 80 wt. % of a (meth)acrylic monomer and/or oligomer not having an isocyanate group;
   0.1 wt. % to 3.0 wt. % of a photoinitiator;
   0 wt. % to 3.0 wt. % of an organometal catalyst; and
   0.1 wt. % to 3.0 wt. % of a peroxide;
the total weight percents of the components in the adhesive composition add up to 100 wt. %.

9. A method for bonding and sealing using the adhesive composition according to claim 1, said method comprises:
   irradiating the region to be bonded or sealed that is coated with the adhesive composition of the invention with UV-light;
   placing the parts to be bonded or sealed under a heat-curing condition; and/or
   placing the parts to be bonded or sealed under a moisture-curing condition.

10. A liquid crystal display product assembled with the adhesive composition according to claim 1.

* * * * *